United States Patent
Boutnaru (10) Patent No.: US 10,262,138 B2
(45) Date of Patent: Apr. 16, 2019

(54) TECHNIQUES FOR RANSOMWARE DETECTION AND MITIGATION

(71) Applicant: PAYPAL, INC., San Jose, CA (US)

(72) Inventor: Shlomi Boutnaru, Moddin (IL)

(73) Assignee: PAYPAL, INC., San Jose, CA (US)

( * ) Notice: Subject to any disclaimer, the term of this patent is extended or adjusted under 35 U.S.C. 154(b) by 197 days.

(21) Appl. No.: 15/266,974

(22) Filed: Sep. 15, 2016

(65) Prior Publication Data

US 2018/0075239 A1 Mar. 15, 2018

(51) Int. Cl.
G06F 21/56 (2013.01)
G06F 21/60 (2013.01)
G06F 21/55 (2013.01)

(52) U.S. Cl.
CPC .......... *G06F 21/566* (2013.01); *G06F 21/554* (2013.01); *G06F 21/60* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 5,797,022 A * | 8/1998 | Shimotono | | G06F 1/32 711/135 |
| 9,436,824 B1 * | 9/2016 | Levchenko | | G06F 9/46 |
| 9,514,309 B1 * | 12/2016 | Mann | | G06F 21/56 |
| 2013/0111547 A1 * | 5/2013 | Kraemer | | G06F 21/552 726/1 |
| 2017/0364681 A1 * | 12/2017 | Roguine | | G06F 21/554 |
| 2018/0018458 A1 * | 1/2018 | Schmugar | | G06F 21/566 |

OTHER PUBLICATIONS

Friedman, Mark, et al. "File Cache Performance and Tuning" [Online] Windows 2000 Performace Guide [retrieved on Aug. 15, 2016]. Retrieved from the Internet: <URL: https://msdn.microsoft.com/enus/library/bb742613(d=printer).aspx>, Jan. 2002.

Evans, Chris "Write-through, write-around, write-back:Cache explained" [Online] [retrieved on Aug. 15, 2016]. Retrieved from the Internet: <URL: http://www.computerweekly.com/feature/WritethroughwritearoundwritebackCacheexplained>.

(Continued)

*Primary Examiner* — Alexander Lagor
(74) *Attorney, Agent, or Firm* — Haynes and Boone, LLP (57) ABSTRACT

An attacker who gains control of a computer system using malicious software (malware) may be able to do anything to the data on the system. One type of malware, sometimes referred to as ransomware, can encrypt the contents of a hard drive or other data repository, preventing those contents from being accessed by their rightful owners. A ransomware attack can be greatly disruptive to an individual or business, and result in loss of data and loss of computer system uptime, impacting overall computing productivity. By detecting that ransomware is operating on a computer (e.g. by correlating between the original data and content in different cache layers), the negative effects of the ransomware may be mitigated or avoided.

20 Claims, 7 Drawing Sheets

(56) References Cited

OTHER PUBLICATIONS

Unknown "Detecting encryption in real-time?" [Online]. Cryptography Stack Exchange [retrieved on Aug. 10, 2016]. Retrieved from the Internet: <URL: http://crypto.stackexchange.com/questions/34045/detectingencryptioninrealtime>.

Unknown "How to Determine if Netbackup client is performing encrypted backups after setting the Encryption attribute in NetBackup policies" [Online] [retrieved on Sep. 13, 2016]. Retrieved from the Internet: <URL: https://www.veritas.com/support/en_US/article.000011599>, Sep. 14, 2015.

Shabtai, Asaf "Detecting unknown malicious code by applying classification techniques on OpCode patterns" [Online] Security Informatics, 1:1 [retrieved on Sep. 21, 2016]. Retrieved from the Internet: <URL: https://security-informatics.springeropen.com/articles/10.1186/2190-8532-1-1>, 2012.

Malhotra, Paras "Detection of encrypted streams for egress monitoring" [Online]. Retrospective Theses and Dissertations, [retrieved on Sep. 21, 2016]. Retrieved from the Internet: <URL: http://lib.dr.iastate.edu/cgi/viewcontent.cgi?article=15631&context=rtd>, Paper 14632.

Unknown "Difference between Hardware implemented algorithm and software implemented one?" [Online] Cryptography Stack Exchange [retrieved on Sep. 23, 2016] Retrieved from the Internet: <URL: http://crypto.stackexchange.com/questions/31624/differencebetweenhardwareimplementedalgorithmandsoftwareimplementedone>.

* cited by examiner

TECHNIQUES FOR RANSOMWARE DETECTION AND MITIGATION

TECHNICAL FIELD

This disclosure relates to computer system security. More particularly, this disclosure relates to techniques for detecting and/or mitigating ransomware or other types of executables that may cause data loss.

DETAILED DESCRIPTION

One type of malicious software (malware) that affects computers today is known as ransomware. This type of software, if given access to a computer system, may use encryption on the contents of a hard drive or other data storage device (possibly including networked files). Once encrypted, the original data may be no longer no longer accessible. As such, a system user who lacks decryption keys will no longer be able to readily access his or her data.

Once the original data has been encrypted and the plain clear-text (non-encrypted) version is deleted, a system user may be contacted with a demand from a malicious party who has breached system security with ransomware. Frequently, the malicious party will demand that the user pay him some amount of anonymous crypto-currency (e.g., BitCoin) in order to have the user's files decrypted so that they are accessible again. If the user does not pay, then the files may remain encrypted and inaccessible.

Unless the user has a good backup system, large amounts of data may be lost. Furthermore, even if a backup system is in place, data could still be lost as files that have been encrypted by ransomware may be automatically backed up in encrypted form. Depending on data retention schemes, a backup of non-affected ("good") data could even be overwritten by ransomware-encrypted data. Thus, consumers and small businesses may be hit particularly hard by ransomware, as these entities often do not have good data backup policies. Even if backup data exists, replacing the entire contents of a hard drive or other storage device may be a slow process. For a business, replacing lost data from backup may also mean halting or reducing operations while the data is restored. Thus, unchecked ransomware has a large potential to be destructive and impact system uptime and productivity.

Detecting ransomware operations at an early stage, however, may allow its effects to be mitigated or prevented. The present disclosure discusses various techniques relating to ransomware prevention and mitigation.

In some embodiments, preventing and mitigating ransomware includes taking advantage of existing system data caches to detect possible ransomware and to take remedial actions in response. These aspects and more are discussed below.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.).

Various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Figure 1A:
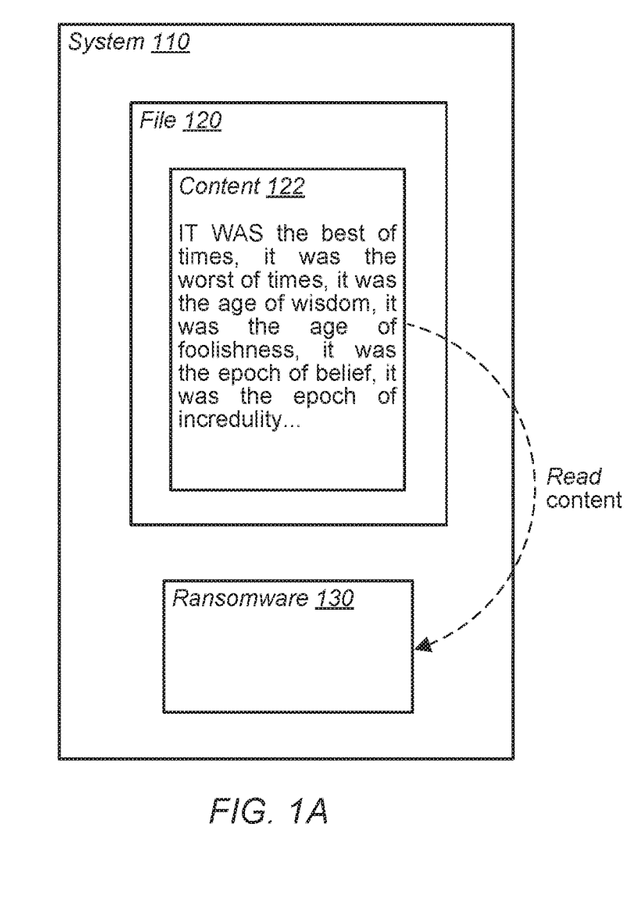
FIGS. 1A and 1B are block diagrams illustrating certain aspects of a ransomware process, according to some embodiments.

Turning to FIG. 1A, a block diagram of a system is shown illustrating an aspect of ransomware operations. In this diagram, system 110 has a file 120 that includes content 122. System 110 has also been infected with ransomware 130 as shown (e.g., in this embodiment, ransomware 130 is currently executing on system 110).

Content 122 is not encrypted in this example. Instead, it includes English text. File 120 may include any type of content, however, such as audio, video, text, pictures, slideshows, etc. This content may be in a variety of different data formats.

In FIG. 1A, ransomware 130 is attempting to read content 122 from file 120. After reading the content, it can then encrypt it and delete the original version, rendering it inaccessible to a user.

Figure 1B:
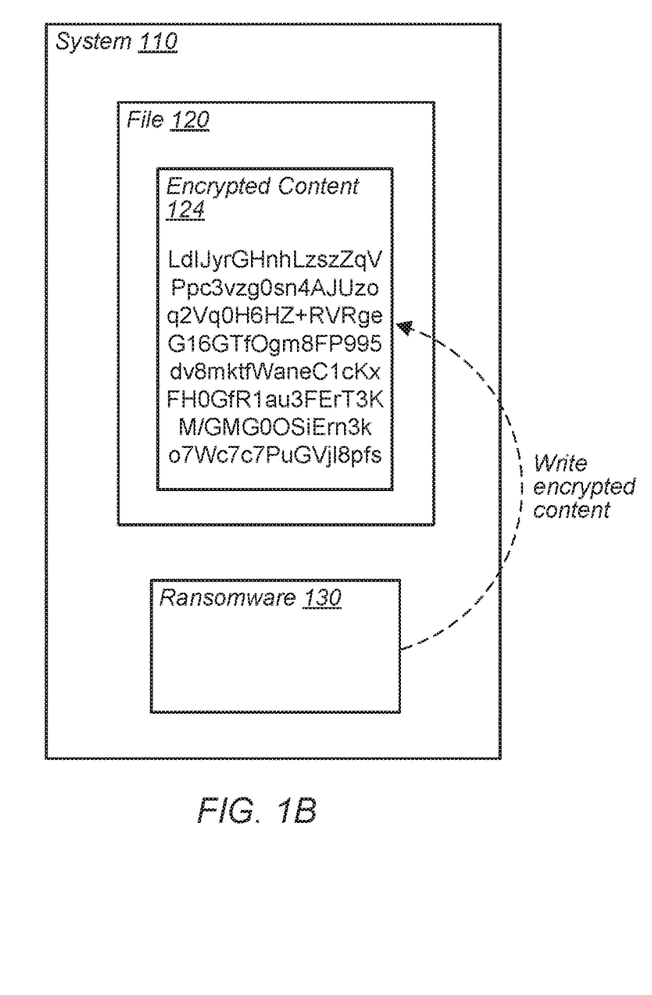

Turning to FIG. 1B, another block diagram is shown of system 110. In this figure, ransomware 130 has successfully read content 122, and encrypted it. Ransomware 130 then stores the encrypted content 124 back into file 120, overwriting the original content. Note that in various embodiments, ransomware 130 may opt to create a new file instead of simply writing back to an original file.

Figure 2A:
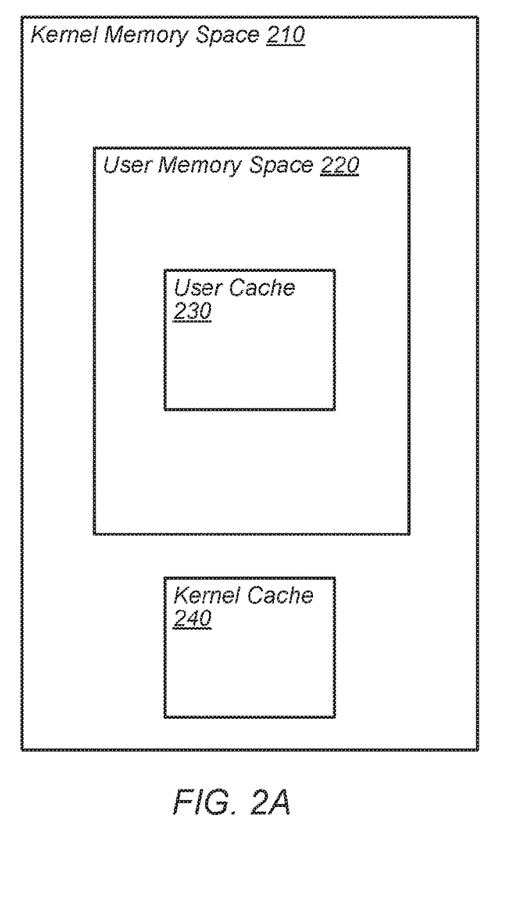
FIGS. 2A and 2B are block diagrams illustrating aspects of a cache hierarchy, according to some embodiments.
Figure 2B:
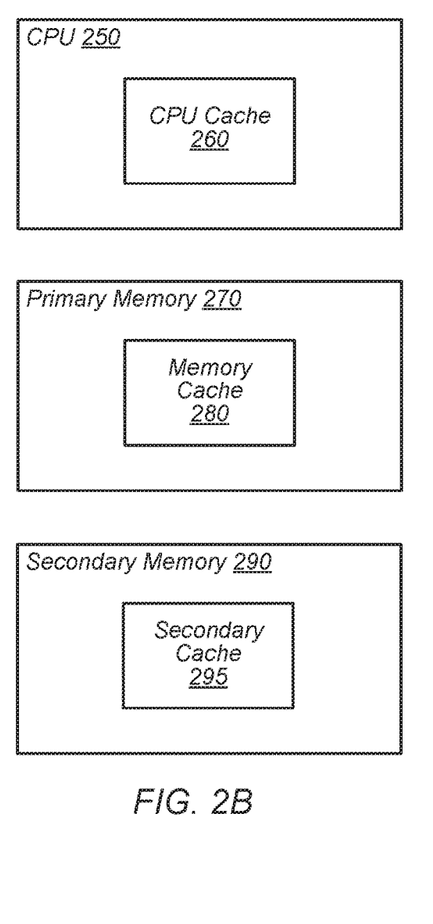

FIGS. 2A and 2B relate to a cache hierarchy that may be present in system 110 in various embodiments. As discussed further below, the particular different caches that are available in system 110 may help allow detection and mitigation of ransomware by focusing on particular data operations that are being performed via one or more caches.

FIG. 2A shows a diagram of one embodiment of kernel and user memory spaces. In this embodiment, kernel memory space 210 corresponds to one or more locations of physical and/or virtual memory. There may be one kernel memory space 210 per instance of an operating system, but kernel memory space 210 may include multiple ones of user memory space 220. (That is, an operating system instance may have multiple users, each of whom has their own respective user memory space 220).

User cache 230 and kernel cache 240 are software-implemented memory caches in the embodiment of FIG. 2A. As used herein, the term software-implemented cache indicates that these caches do not necessarily have dedicated physical memory—rather, the underlying storage space could vary and change over time. For example, user cache 230 could be 4 MB at one point, but then be increased to 8 MB by software in response to changing conditions (of course many different cache sizes are possible, and the above is just one example). Kernel cache 240 might likewise change based on different server configuration options, for example. Thus, the physical storage space used to implement user cache 230 and kernel cache 240 may vary, in the embodiment of FIG. 2A (e.g., a fixed amount of physical memory is not necessarily used).

User cache 230 corresponds to a particular user, and is implemented at the user level in the embodiment of FIG. 2A. Nonetheless, user cache 230 is not necessarily directly operated by the user—an operating system may instead establish and manage user cache 230. Multiple user caches 230 may exist corresponding at a one to one ratio to various active system users (or, a fewer number of caches may exist, in some embodiments). User actions may affect operations of user cache 230 by changing available user settings in some embodiments—for example, turning off read or write optimization, for various operating systems, may cause all or a portion of user cache 230 to be disabled. (In one embodiment, the ability of a user to disable user cache 230 is the reason that multiple cache levels are checked for ransomware activity, since malicious software may be able to inactivate some caches but not others). By checking multiple cache levels for evidence of ransomware activity, detection can be more robust.

Kernel cache 240 is a system-level cache in the embodiment of FIG. 2A. Accordingly, functionality of kernel cache 240 cannot be altered a user that does not have privileged (special) access, in various embodiments (such as superuser or root access). The ability to cause data to be stored in kernel cache 240 therefore may be unaffected by user actions, in one or more embodiments. While user cache 230 could be turned off in some instances, kernel cache 240 may remain functioning. In one embodiment, kernel cache 240 is implemented as a single system-wide cache for an operating system (but may store data for multiple users simultaneously). Kernel cache 240 may also store other system data that is not accessible by a non-privileged user.

Turning to FIG. 2B, a block diagram is shown of various hardware and corresponding caches that may be present in system 110. In this figure, CPU 250 includes a CPU cache 260. Primary memory 270 includes a memory cache 280. This primary memory may be relatively high-speed memory such as a RAM that is used for programs and data that are in active use. Secondary memory 290 includes a secondary cache 295. Secondary memory 290 includes, in various embodiments, hard disks or other relatively slower (and larger) storage devices. Thus, various hardware level caches may exist in different portions of system 110. These hardware level caches can be accessed, in various embodiments, to detect ransomware activity.

Figure 3A:
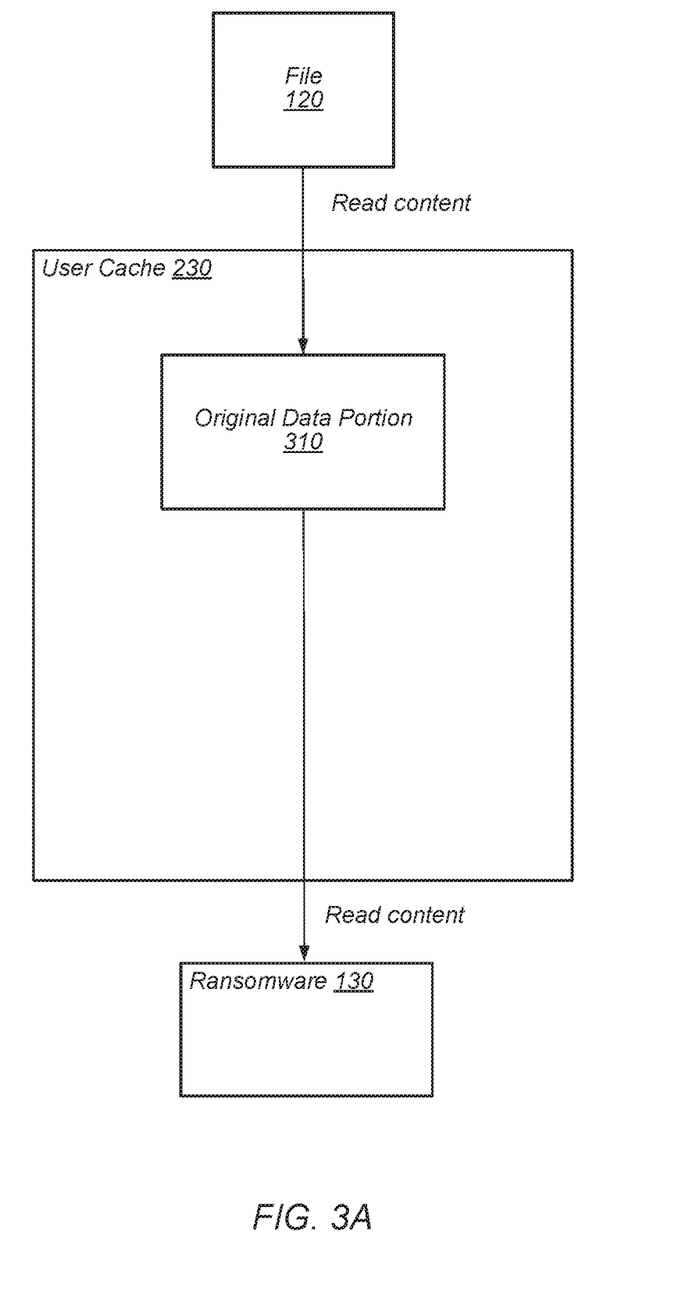
FIGS. 3A and 3B are diagrams illustrating an interaction between ransomware, a file, and a cache, according to some embodiments.
Figure 3B:
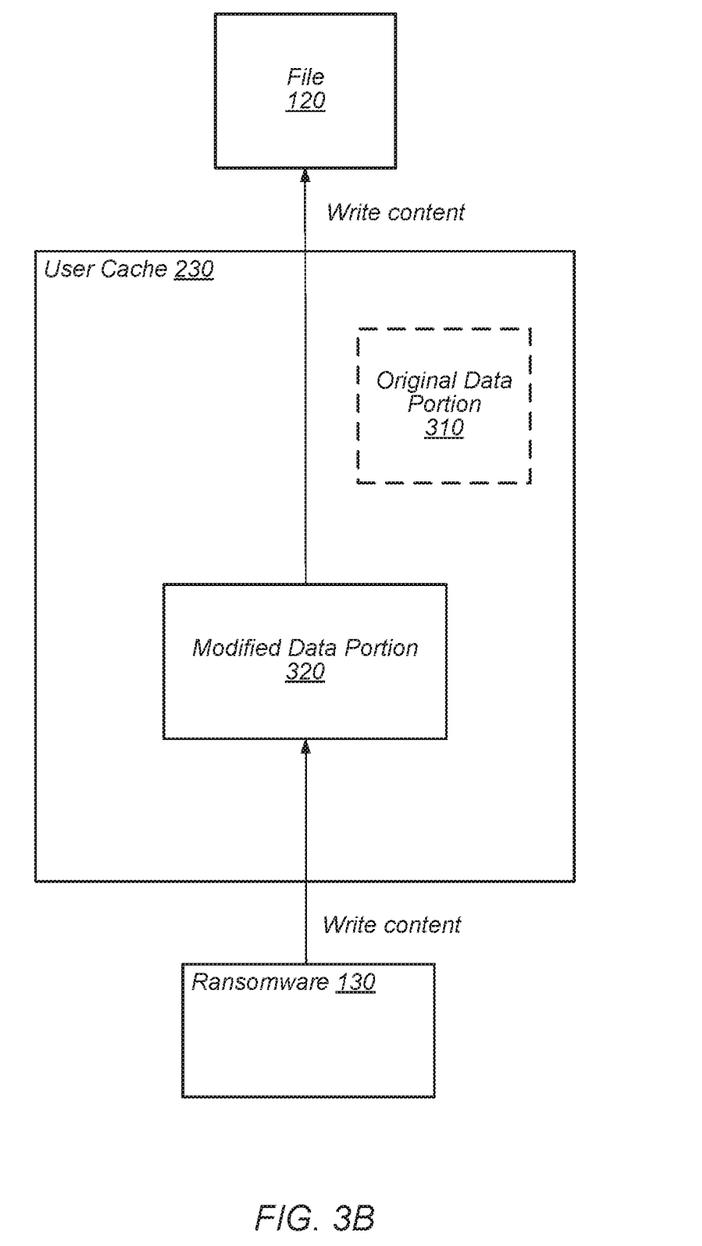

FIGS. 3A and 3B depict one embodiment of user cache 230 relative to read and write operations being performed by ransomware 130. These figures help illustrate how the utilization of user cache 230 (or any other cache, in various embodiments) can be helpful in detecting activity by ransomware 130.

In the embodiment of FIG. 3A, ransomware 130 is performing a read operation from file 120. This read operation is normally handled by an operating system—that is, ransomware 130 makes a program call to read contents of file 120, and the operating system receives that call, and then uses underlying device drivers and other functionality to cause contents of file 120 to be read from storage (hard disk, etc.). Ransomware 130 may read all or a portion of file 120 in order to then encrypt the underlying data before making it inaccessible to a user (e.g. by overwriting the original data with the encrypted data). Note that references herein to ransomware 130 "deleting" data may refer to either overwriting data or deleting a file, in various instances. Also, note that when ransomware 130 reads from file 120 and encrypts its data, it does not have to read the file in its entirety but can instead read and encrypt in smaller chunks. Even with piecewise reading and encryption, however, the techniques described herein still allow for mitigation of ransomware.

When the operating system handles the read operation from ransomware 130, an original data portion 310 becomes stored in user cache 230. The operating system may store original data portion 310 in user cache 230 as a routine operation (because a file that was recently read is oftentimes more likely to be read from again in the near future, compared to other files that were not recently accessed, for example). Original data portion 310 may also be stored in user cache 230 because the operating system may want to write to a hard drive in bigger chunks (larger amounts of data) than the size of a current file.

Accordingly, after the read operation of FIG. 3A, ransomware 130 has a copy of original data portion 310, but another copy of original data portion 310 has also been retained in user cache 230. Note that similar operations to those discussed relative to FIGS. 3A and 3B can occur for any cache, such as kernel cache 240, as well as any of hardware-implemented caches CPU cache 260, memory cache 280, and secondary cache 295.

Turning to FIG. 3B, user cache 230 is depicted relative to a write operation being performed by ransomware 130 (subsequent to the read operation of FIG. 3A). In this embodiment, ransomware 130 has completed its earlier read, and original data portion 310 from file 120 is still present in user cache 230. As shown, ransomware 130 has modified original data portion 310 and is now writing it back to file 120 as modified data portion 320. Modified data portion 320 may be an encrypted version of original data portion 310, for example. As per the read operation of FIG. 3A, the present write operation is handled by an operating system in various embodiments.

When ransomware 130 writes modified data portion 320, it may be stored in user cache 230 temporarily before it is actually written to permanent storage (e.g. persistent storage that retains data after a power cycle). Thus, modified data portion 320 is stored in user cache 230 (or another cache) before the contents of file 120 become permanently changed, in various embodiments. Because file 120 may not become irrevocably changed the instant that ransomware 130 issues a write instruction, this allows an opportunity to analyze modified data portion 320 relative to original data portion 310 to determine if ransomware 130 is performing a damaging operation. (Again, note that an observing or monitoring process may not be aware that ransomware 130 is prohibited malware at the time a read and overwrite are attempted; instead, ransomware 130 may simply be an unknown process.)

Accordingly, per FIGS. 3A-3B, when ransomware 130 reads data, a copy of that data may be stored in a cache. When ransomware 130 writes data, a copy of that data may also be stored in one or more caches prior to the write being stored to disk (or other permanent data storage). As discussed herein, there may be multiple levels of caches before getting to storage media, and thus in addition to a user cache (or in place of a user cache) there may also be one or more of a kernel cache, controller cache, physical device cache, or software application level caches. Each of these caches may be analyzed and used in various embodiments to detect ransomware.

Figure 4:
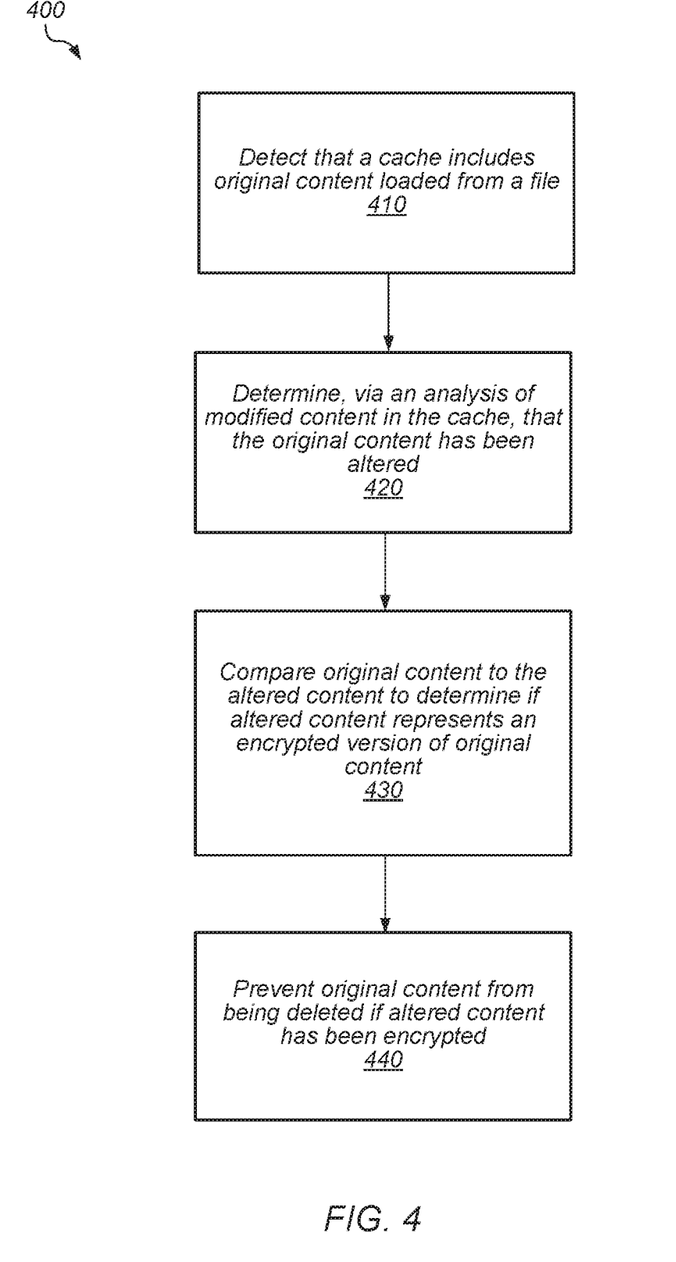
FIG. 4 illustrates a flowchart of a method that relates to determining if ransomware is believed to be operating on a computer system and taking a preventive action in response, according to some embodiments.

Turning to FIG. 4, one embodiment of a method 400 related to ransomware detection and mitigation is shown. The operations of method 400 may be performed by a program running on system 110, a hardware device attached to system 110, or any other suitable software or hardware, in various embodiments. In one embodiment, for example, operations in method 400 may be performed by a virtual machine monitor or other software outside the memory space of a virtual machine, thus making it more difficult for ransomware 130 to defeat monitoring. For ease of explanation, however, operations of method 400 are described below relative to system 110.

In operation 410, system 110 detects that a cache includes original content loaded from a file. This operation may include, in various embodiments, detecting that user cache 230 or kernel cache 240 has received content due to a read operation, for example. Operation 410 may also include detecting that a hardware-implemented cache, such as CPU cache 260, memory cache 280, or secondary memory cache 295 has received original content loaded from a file.

Note that in various instances, operation 410 may be performed in association with the read from a file, or may occur after the file has already been read (e.g., operation 410 can be performed even after file content has been present in a cache for some period of time). Operation 410 may be performed by a software process running on system 110, in some embodiments, such as a process executed by an operating system of a virtual machine, or by a virtual machine monitor or other process that is outside of a virtual machine. Operation 410 may also be performed by a hardware device attached to system 110.

In operation 420, system 110 determines, via an analysis of modified content detected in a cache, that original content of a file has been changed to produce altered content. (Thus, operation 420 may also include performing the analysis of modified content in various embodiments).

The analysis of modified content for operation 420 may include determining that a particular process (e.g., ransomware 130) has read a first copy of content from a file (which is now stored in a cache), then attempted to write a modified version of that content back to the file (with the modified version being stored in cache at least temporarily before being written to permanent storage).

Operation 420 thus also includes, in some embodiments, detecting that a cache has received particular data to be written to long-term storage and correlating that data to original content. Correlating two pieces of cached data (for the purposes of making a comparison between "before" and "after" versions) can be performed in a variety of ways. In one embodiment, user cache 230 (or any other of the caches mentioned herein) maintains contextual data about content that is stored in the cache. This contextual data may include but is not limited to: a process that accessed the content and caused it to be stored in cache; a location in permanent storage of the content; a filename and/or file path with which the content is associated; an offset or location within a file with which the content is associated (e.g., a particular segment, or bytes 4096-8191, etc.), a time the data was first stored in cache, a time the data was last accessed in cache, whether data was first saved in cache due to reading, or due to writing, or other information. By comparing contextual data for two pieces of content in cache (e.g., original data previously read from disk and modified data to be written to disk), system 110 can determine that the two pieces of content correspond to one another. Once it is determined that two pieces of content correspond to one another, they can be compared as described below.

In terms of correlating cached content (relative to ransomware detection), in general, a variety of further tactics to those discussed above can be used. In one embodiment, another user mode and/or kernel mode cache can be provided and matched against. Custom driver software can also be used to read the data from user mode/kernel mode caches. VMI can be used to read the user mode/kernel mode caches; specific opcodes in the CPU can be used to read caches; communication to a device controller can be used to read hardware caches; and specific code can be run on a device to read a cache. Also, hardware can be added before a controller and/or a device to read cache and compare it to the data from the operating system level.

In one embodiment user cache 230 (or another cache) manages content correlation automatically, and is programmed to determine that content to be written corresponds to an existing cache entry (based on one or more factors discussed above, for example). An existing cache entry may be overwritten/evicted from cache, for example, by incoming data that user cache 230 detects corresponds to previous data. Operation 430 (discussed below) may be performed at this point, in some embodiments.

Accordingly, in operation 430, two pieces of content in cache are compared by system 110 to determine if altered content in the cache (e.g., to be written) represents an encrypted version of original content (e.g., that was previously read).

In one embodiment, this comparing includes using a calculated entropy level of the original content, and then comparing that to a calculated entropy level for the altered content. A goal of encryption is frequently to make data look as random as possible (high entropy level). Thus, if system 110 sees a file read from disk that has a relatively low entropy level, then a modified file is written back to disk with a relatively high entropy level, it can be assumed (in various embodiment) that the modified file represents an encrypted version of the original file. Simply opening a text document and changing a few words (editing a report or manuscript, for example) is unlikely to have a significant change on the entropy level of that file, in one or more embodiments. Entropy level can therefore be used as a proxy for encryption in various instances.

Entropy can be calculated as a degree of randomness of data in a file or file portion in some embodiments. For example, an entropy level on a 0-100 scale could be determined by analyzing particular portions of data relative to particular other portions of data for a particular data segment or file. For purposes of comparison, an entropy level can be determined as high, low, or intermediate relative to other files. To determine if an entropy change is believed to indicate an encryption operation, various standards can be employed. Using the 0-100 scale, a particular threshold shift could indicate encryption. This threshold shift could be measured in absolute terms (e.g., +50 points on a 100 point scale) or could be measured in percentage terms (e.g., 50%+). A lower threshold of either could be taken as well (e.g., if a file garners at least a 50 point jump or a 50% increase, an encryption event will have been deemed to occur). Many different threshold levels may be set in various embodiments, of course. Different entropy threshold levels may also be set for different types of files (originally higher compressed files such as ZIPs, MP3s, MP4s, JPGs etc. may have different threshold entropy difference levels set relative to other file types such as plain text, MS-WORD docs, GIF, etc.). Thus, for an MP3 file, different amounts of entropy change (before/after writing), for example, may be deemed to indicate an encryption operation by system 110 relative to another file type such as plain text (.txt). In one embodiment with a 0-100 entropy scale, 100 would represent pure random data. In this embodiment, any data that scores above a threshold (e.g., 80 points) would be considered to be encrypted. (Note that other entropy scales are possible, such as 0-8, and entropy scales may be normalized in various embodiments.) Various embodiments for determining if one piece of content corresponds to another piece of content also include but are not limited to system 110 performing a hash of the two, comparing each bit by bit; performing fuzzy (piecewise) hashing of the two pieces of content; or cross validating or any other similar mechanism.

In a related aspect, system 110 can also attempt to capture encryption keys used by a ransomware program. For example, if during a scan system 110 sees a buffer (in a cache or elsewhere) which in looks random (e.g. high entropy) but has a length of an encryption key (for symmetric encryption—128 bit, 256 bit, for example; for asymmetric keys 1024 bit, 2048 bit, for example) then the data in this buffer may be an encryption key used by ransomware. In this case, system 110 can save or remotely transmit possible encryption key information to an administrator.

In operation 440, system 110 prevents original content from being deleted if altered content is believed to have been encrypted, in one embodiment. Prevention from deletion may take various forms, as discussed below.

In one embodiment, operation 440 includes causing an alert to be transmitted to a user of system 110 (or a user of another system). This alert may inform the user that a program appears to be attempting to encrypt data and delete the underlying data, and then present the user with a dialog asking the user whether they wish to allow the operation to proceed, or to halt the operation. Accordingly, operation 440 may also include at least temporarily halting original content on disk (or other storage) from being overwritten with altered content that may be encrypted. This can include having an operating system pause execution of a process that is attempting to perform the overwrite (e.g., ransomware 130), or simply pausing the write operation and preventing its completion until a user grants consent. If the user is not performing encryption operations herself, she may be able to prevent or mitigate damage by ransomware 130 once she is alerted to its activity.

In another embodiment, operation 440 includes causing a backup copy of original content to be sent to a remote server (or another destination). This backup copy may be sent automatically and without user intervention as a preventative measure. By transmitting the original content to a remote system that is out of reach of ransomware 130, the data may be protected even if ransomware 130 successfully deletes it. In one embodiment, detecting that one or more encryption/deletion events have occurred within a particular timeframe may trigger a full system backup for system 110 (by executing a remote backup plan for a number of different files and/or directories on system 110). Thus, as an example, if system 110 observes that at least 10 potential encryption/deletion events have occurred (e.g., altered content with high entropy is overwriting original content with relatively lower entropy) within a 2-minute timeframe, then system 110 may consider itself to be under attack by a ransomware program and attempt to quickly back up as many files as possible (perhaps according to a specified plan in which the most critical files or directories are backed up first).

In one embodiment, operation 440 includes not just sending a backup copy to a remote server, but encrypting that backup copy first using a public key of the server (leading to a situation in which only the server can decrypt, in various embodiments). This may provide additional data security and privacy in certain cases. Operation 440 also may include fooling a ransomware program into thinking it has been successful—for example, intercepting its activities, giving it different bytes to encrypt and/or redirecting results of encryption to a different free location.

A whitelist of programs, in some instances, may also be used to determine if a process should be allowed to make an encryption and/or deletion operation on data. A user may be attempting to encrypt a file using a legitimate security program, for example, or could be using a compression program that might also trigger an alert from the method of FIG. 4. Thus, a whitelist of known binaries (or other information) can be maintained by system 110 (or another system), and if a program is on this list, the user may not be alerted about a perceived encryption/deletion operation. Note that checking a program against a whitelist can involve checking the program on both a filesystem (e.g. on disk for example) and in memory (e.g., as actively loaded and/or running on the system).

Figure 5:
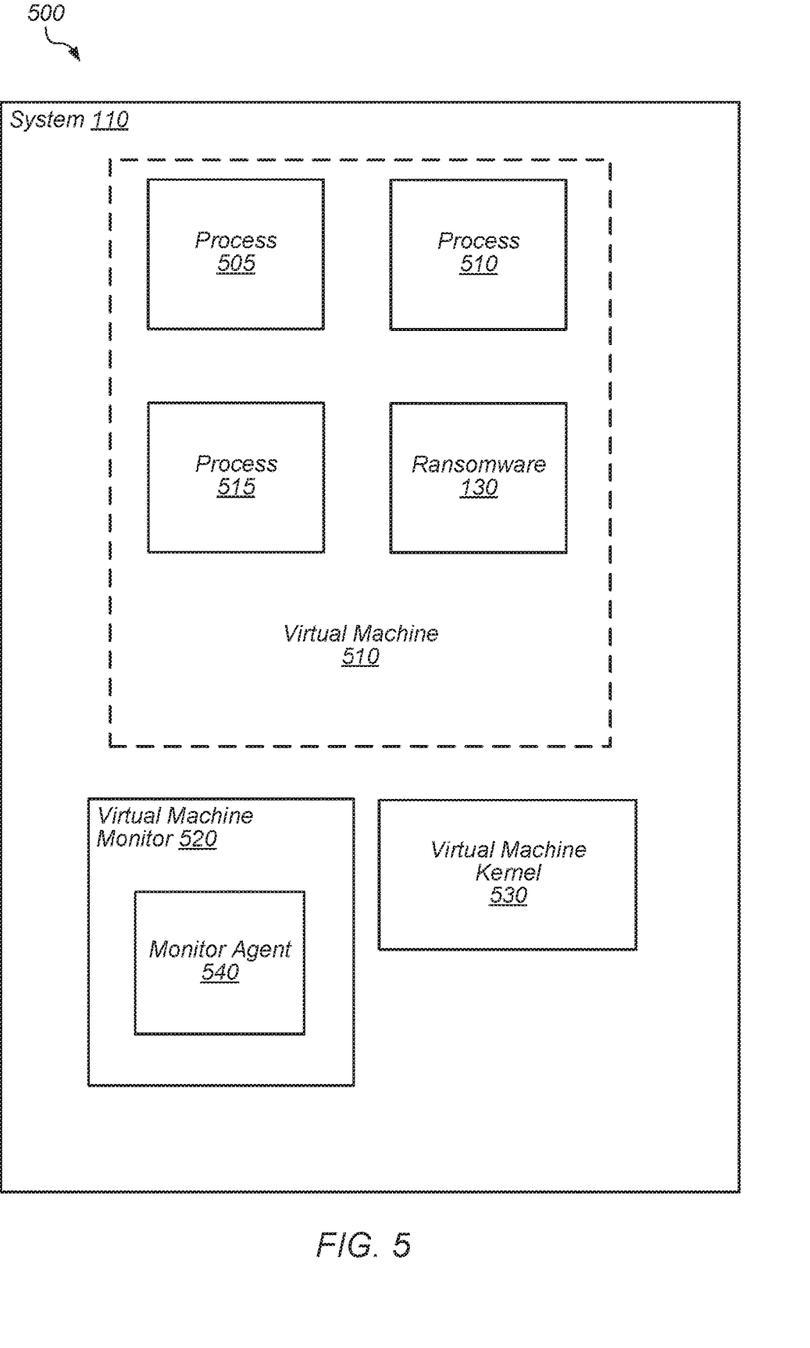
FIG. 5 is a block diagram of one embodiment of a system in which a virtual machine monitor may be used to help detect potential ransomware in a virtualized environment (and to help avoid circumvention by the ransomware).

Turning now to FIG. 5, another embodiment of system 110 is shown in which system 110 is configured to run one or more virtual machines.

As shown, virtual machine 510 is being used to run processes 505, 510, 515, and ransomware 130. Additional virtual machines not depicted may also be running on system 110.

Ransomware 130, in some embodiments, may attempt to prevent its own deletion or containment by eliminating monitoring or anti-virus programs that are running on system 110. Thus, in a system that is simply running one instance of an operating system on top of bare hardware, ransomware 130 has the potential to take over the entire system.

In the embodiment of FIG. 5, however, virtual machine kernel 530 is used to run one or more virtual machines that are self-contained in that processes running inside those virtual machines may not be able to see outside of their own limited memory space. Thus, virtual machine monitor 520 is a process that is executing outside virtual machine 510 in this embodiment. Virtual machine monitor 520 may allow for virtual machine introspection on virtual machine 510. Virtual machine introspection allows various aspects—process data, instructions, memory, etc. of virtual machine 510 to be observed from outside the virtual machine itself. Monitor agent 540 is included within virtual machine monitor 520 in the embodiment shown, though it may also be a different process outside of virtual machine 510 in various other embodiments. By using virtual machine introspection techniques, ransomware 130 can potentially be detected by an outside process that it may be unable to defeat. (Accordingly, in one embodiment, monitor agent 540 may perform some or all of the operations of method 400.)

Note generally that caches can be read at different levels (using VMI techniques or not), such as user mode caches of a virtual machine, kernel mode caches of a virtual machine, caches of a virtualized controller, caches of a virtualized device, caches of a non-virtualized controller, and caches of a physical device. Thus, using VMI in some instances, contents of a virtualized (e.g. software-implemented) version of what would ordinarily be a physical hardware cache can be easily accessed (and potentially more easily than an actual physical hardware cache).

Computer-Readable Medium

Figure 6:
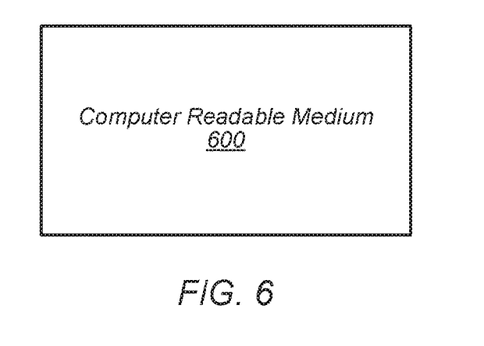
FIG. 6 is a block diagram of one embodiment of a computer readable medium.

Turning briefly to FIG. 6, a block diagram of one embodiment of a computer-readable medium 600 is shown. This computer-readable medium may store instructions corresponding to the operations of FIG. 4 and/or any techniques described herein. Thus, in one embodiment, instructions corresponding to monitor agent 540 may be stored on computer-readable medium 600.

Program instructions may be stored on a non-volatile medium such as a hard disk or FLASH drive, or may be stored in any other volatile or non-volatile memory medium or device as is well known, such as a ROM or RAM, or provided on any media capable of staring program code, such as a compact disk (CD) medium, DVD medium, holographic storage, networked storage, etc. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as VBScript. Note that as used herein, the term "computer-readable medium" refers to a non-transitory computer readable medium.

Computer System

Figure 7:
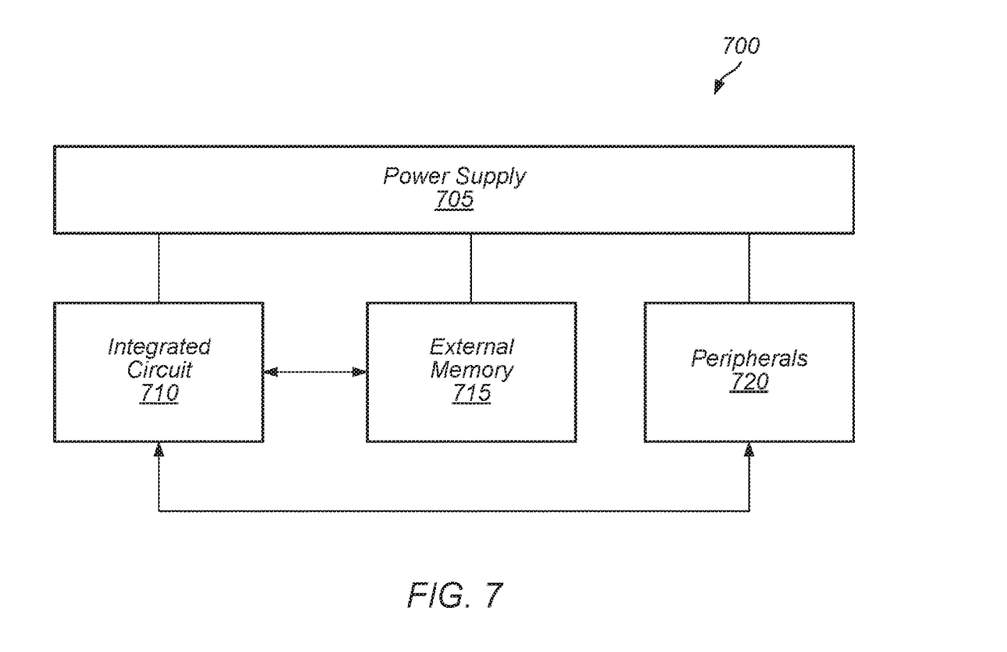
FIG. 7 is a block diagram of one embodiment of a system.

In FIG. 7, one embodiment of a computer system 700 is illustrated. System 110 thus includes one or more features of computer system 700 in various embodiments.

In the illustrated embodiment, system 700 includes at least one instance of an integrated circuit (processor) 710 coupled to an external memory 715. The external memory 715 may form a main memory subsystem in one embodiment. The integrated circuit 710 is coupled to one or more peripherals 720 and the external memory 715. A power supply 705 is also provided which supplies one or more supply voltages to the integrated circuit 710 as well as one or more supply voltages to the memory 715 and/or the peripherals 720. In some embodiments, more than one instance of the integrated circuit 710 may be included (and more than one external memory 715 may be included as well).

The memory 715 may be any type of memory, such as dynamic random access memory (DRAM), synchronous DRAM (SDRAM), double data rate (DDR, DDR2, DDR6, etc.) SDRAM (including mobile versions of the SDRAMs such as mDDR6, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 710 in a chip-on-chip configuration, a package-on-package configuration, or a multi-chip module configuration.

The peripherals 720 may include any desired circuitry, depending on the type of system 700. For example, in one embodiment, the system 700 may be a mobile device (e.g. personal digital assistant (PDA), smart phone, etc.) and the peripherals 720 may include devices for various types of wireless communication, such as wifi, Bluetooth, cellular, global positioning system, etc. Peripherals 720 may include one or more network access cards. The peripherals 720 may also include additional storage, including RAM storage, solid state storage, or disk storage. The peripherals 720 may include user interface devices such as a display screen, including touch display screens or multitouch display screens, keyboard or other input devices, microphones, speakers, etc. In other embodiments, the system 700 may be any type of computing system (e.g. desktop personal computer, server, laptop, workstation, net top etc.). Peripherals 720 may thus include any networking or communication devices necessary to interface two computer systems.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory machine-readable medium having stored thereon machine-readable instructions which, when executed by one or more processors, cause a machine to perform operations comprising:
   detecting that a cache of a computer system includes a first copy of original content loaded from a file;
   retaining, in the cache, a second copy of the original content loaded from the file;
   determining, via an analysis of modified content detected in the first copy, that the modified content represents an attempted change to the original content of the file;
   comparing the original content of the second copy to the modified content detected in the first copy to determine if the modified content represents an encrypted version of the original content; and
   preventing the original content from being deleted if the modified content has been encrypted.

2. The non-transitory machine-readable medium of claim 1, wherein the comparing includes determining if a first entropy level for the modified content is higher than a second entropy level for the original content.

3. The non-transitory machine-readable medium of claim 2, wherein determining if the first entropy level is higher comprises determining if a threshold amount of increase in overall entropy has occurred.

4. The non-transitory machine readable medium of claim 1, wherein the operations further comprise:

detecting that the cache has received particular data to be written to long-term storage; and correlating the particular data to the original content;

wherein the comparing is performed based on the correlating.

5. The non-transitory machine-readable medium of claim 1, wherein the cache is a user-level software-implemented cache.

6. The non-transitory machine-readable medium of claim 1, wherein the cache is a system-level software-implemented cache.

7. The non-transitory machine-readable medium of claim 1, wherein the operations further comprise checking a plurality of software-implemented caches to determine if the original content of the file has been changed.

8. The non-transitory machine-readable medium of claim 1, wherein the analysis of the modified content includes analyzing an entirety of the file and an entirety of a modified version of the file.

9. The non-transitory machine-readable medium of claim 1, wherein the operations further comprise:

prior to the preventing, checking if a program that produced the modified content is on a whitelist of allowable programs; and if the program is on the whitelist, allowing the original content to be deleted rather than preventing its deletion.

10. A method, comprising:

detecting that a first copy of original content of a file has been loaded into a cache of a computer system;

retaining, in the cache of the computer system, a second copy of the original content of the file;

determining that the first copy of original content of the file has been changed to produce altered content;

comparing the original content from the second copy to the altered content to determine if the altered content represents an encrypted version of the original content; and preventing the original content from being deleted if the altered content has been encrypted.

11. The method of claim 10, wherein the preventing comprises causing an alert to be electronically transmitted to a user of the computer system, wherein the alert allows the user to override a data deletion operation.

12. The method of claim 10, wherein the preventing comprises causing a backup copy of the original content to be sent to a remote server.

13. The method of claim 10, wherein the detecting is performed by a software process running on the computer system.

14. The method of claim 10, wherein the detecting is performed by a hardware device attached to the computer system, and wherein the cache is a hardware-implemented cache.

15. The method of claim 10, wherein the preventing comprises automatically halting execution, on the computer system, of a process that is attempting to delete the original content of the file.

16. A system, comprising:

a primary memory;

a secondary memory; and one or more hardware processors coupled to the primary memory and the secondary memory, wherein the one or more processors are configured to execute instructions to cause the system to perform operations comprising:

detecting that a cache of the system includes a first copy of a file read from a permanent storage device;

retaining, in the cache, a second copy of the file read from the permanent storage device;

determining, via an analysis of modified content detected in the cache, that the modified content represents an attempted change to the contents of the file by a particular process executing on the system;

comparing, using the second copy of the file read from the permanent storage device, original content of the file to the modified content in the cache to determine if the modified content represents an encrypted version of the original content; and preventing the particular process from deleting the original content of the file from the permanent storage if the modified content has been encrypted and does not correspond to a program on a whitelist.

17. The system of claim 16, wherein the operations further comprise capturing an encryption key used by the particular process executing on the system and transmitting the captured encryption key.

18. The system of claim 16, wherein the whitelist includes one or more programs authorized by a system administrator that perform at least one of encryption or compression.

19. The system of claim 16, further comprising a hardware cache corresponding to the primary memory;

wherein determining that contents of the file have been changed includes an analysis of contents of the hardware cache.

20. The system of claim 16, wherein the analysis of the modified content includes analyzing a limited portion of the file and a corresponding limited portion of a modified version of the file.

* * * * *